Figure 1:
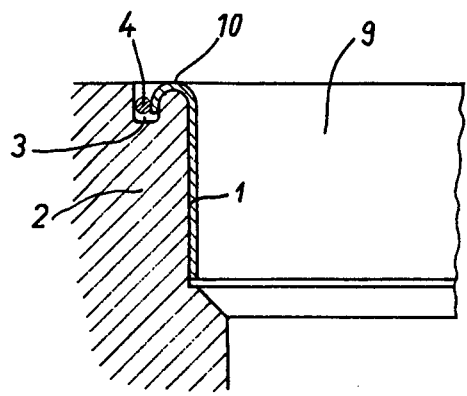

United States Patent [19]

Huber

[11] 3,876,180
[45] Apr. 8, 1975

[54] SEALING CONNECTION
[75] Inventor: Richard Huber, Modling, Austria
[73] Assignee: Klinger AG, Zug, Switzerland
[22] Filed: Jan. 19, 1973
[21] Appl. No.: 325,184

[30] Foreign Application Priority Data
Jan. 21, 1972 Switzerland.......................... 930/72

[52] U.S. Cl................. 251/365; 29/156.4; 29/523; 29/525; 285/222; 285/382.4
[51] Int. Cl............................................. F16k 27/02
[58] Field of Search .......... 251/359, 357, 360, 361, 251/362, 363, 364, 365; 137/375; 285/222, 382.4; 29/523, 526, 156.4 WL, 525; 165/173, 178

[56] References Cited
UNITED STATES PATENTS
| 438,572 | 10/1890 | Coffield | 251/365 |
|---|---|---|---|
| 1,082,119 | 12/1913 | Gunkle | 285/222 |
| 1,164,577 | 12/1915 | Craft | 285/222 |
| 1,267,143 | 5/1918 | Sullivan | 29/523 UX |
| 1,291,646 | 1/1919 | Hughes | 285/222 |
| 1,909,478 | 5/1933 | Wilson | 285/382.4 X |
| 2,014,483 | 9/1935 | Price et al. | 251/363 X |
| 2,303,311 | 11/1942 | Gredell | 285/382.4 X |
| 2,962,306 | 11/1960 | Hawthorne | 285/222 |
| 3,206,165 | 9/1965 | Salmon et al. | 251/357 X |

Primary Examiner—Henry T. Klinksiek
Attorney, Agent, or Firm—Werner W. Kleeman

[57] ABSTRACT

A sealing connecting between a solid body and a tubular sleeve of the type in which the body is provided with a bore and a circumferential groove is formed in the bore, comprises a sleeve having an annular portion penetrating in said groove in the bore of the body, said annular portion of the sleeve being clamped in the direction of its thickness between a locking ring inserted in said groove, and at least one wall of the groove, so that the actual effects of the differential thermal expansion are very slight.

4 Claims, 3 Drawing Figures

SEALING CONNECTION

This invention relates to sealing connections between a solid body and a tubular sleeve. Sealing connections of this type are liable to cause trouble when they shall be detachable or exchangeable and the solid body and the sleeve consist of materials having a different or dissimilar coefficient of thermal expansion.

The object of the invention is the provision of a sealing connection of this type which eliminates these difficulties. Therefore a sealing connection according to the invention between a solid body and a tubular sleeve is characterised in that the sleeve comprises an annular portion penetrating into an annular groove of the body, said annular portion being tightly clamped between a locking ring inserted into said groove and at least one wall of the groove. The annular portion of the sleeve accordingly is only clamped in the direction of its thickness between the plastically deformed locking ring bearing in turn against one wall of the groove and the other wall of the groove, so that the actual effects of the differential thermal expansion are very slight and can be compensated by the elastic bias formed by the clamping action. When the wall of the groove which makes contact with the annular portion of the sleeve exhibits an inclination of about 5 to 15% in the direction of opening of the groove, the locking ring of large oversize can be inserted into the groove and owing to the inclination of the groove wall the ring, upon insertion, can be deformed.

For a tight sealing connection between a solid body formed with a bore therein and a sleeve inserted in the bore, there results a particularly favorable mode of execution of the invention, when the sleeve comprises an annular portion penetrating radially into a groove provided in the bore of the body, which annular portion is clamped in axial direction between the locking ring inserted into the groove and at least one wall of the groove. In this manner it is assured that the axially acting clamping force in fact only varies for such an amount which is subject to the differences in thickness of the sleeve wall caused by thermal expansion.

In many cases the locking ring can have a radial joint; but usually it is advantageous when the locking ring is made in one part and is inserted into the groove by radial expansion. The ring then acts at every point of its circumference to elastically clamp the annular portion of the sleeve to the wall of the groove. It is also advantageous when the annular portion of the sleeve is formed by radial deformation of a part of the sleeve into the groove, because in that case the ring can be formed unsplit. This provides a particularly simple construction when the annular portion is provided at the end of the sleeve.

Usually a separate radial deformation of the sleeve portion is possible. The invention shall enable the provision of a sealing connection in which a separate radial deformation of the annular portion of the sleeve is not necessary.

A method for producing the sealing connection according to the invention is characterised that a ring inserted into the sleeve and located in a radial plane has its diameter enlarged by forces acting outwardly and by simultaneously deforming the sleeve is pressed into the groove provided in the bore of the body, the deformed annular portions of the sleeve being clamped between the locking ring and at least one wall of the groove. In the method according to the invention the locking ring serves, while being radially expanded, to deform a portion of the sleeve so that the latter enters into the groove.

The invention will now be described with reference to the accompanying drawings illustrating two forms of embodiment of a sealing connection according to the invention.

Figure 2:
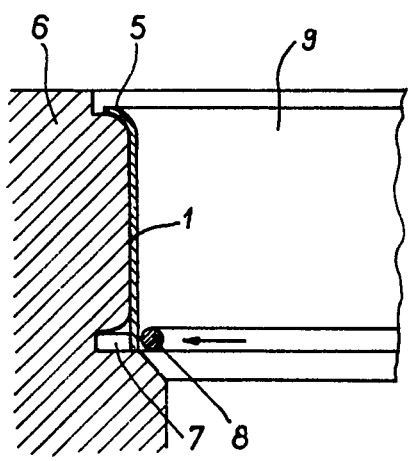
Figure 3:
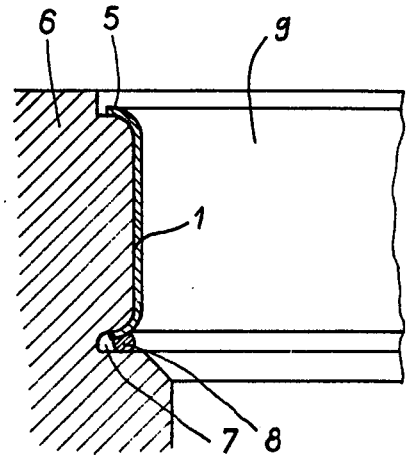

FIG. 1 shows the attachment of a sleeveshaped valve seat by means of a clamping ring pressed axially into a groove, while FIGS. 2 and 3 represent a modification showing the attachment of a cylindrical valve seat by means of a clamping ring pressed in radial direction into an annular groove.

The valve seat represented in FIG. 1 consists of a tubular sleeve in the form of a drawn sheet metal member 1 of austenitic stainless steel which is removably secured in sealing relation to a valve casing 2 of steel, so as to be exchangeable. For this purpose the valve casing which is provided with a through-going bore 9, is formed with an annular groove 3 concentric with the bore 9. An end portion 10 of the sleeve 1 is outwardly bent and penetrates into the groove 3. By forcing a locking ring 4 into the groove 3 the end portion 10 of the sleeve is pressed so tightly against one wall of the groove, that even by operation of the valve during changing temperature conditions a safe seal is ensured. For exchanging the sleeve 1, the locking ring 4 can be removed, whereafter another sleeve can be mounted by means of a new locking ring.

In the modification according to FIGS. 2 and 3 also a valve seat of similar construction as in FIG. 1 is tightly secured to a valve casing 6. In this modification one end of the sleeve 5 is radially pressed into a radial groove 7 formed in the bore 9 in the casing 6. FIG. 2 shows the sleeve 5 after having been inserted in the bore, and also the locking ring 8 inserted in the bore. This ring is formed from a piece of wire which has its joint welded by flush butt welding and subsequently is calibrated to the desired tolerated final thickness and to the desired outer diameter. The end of the sleeve thus nearly covers the radial groove 7, the wall of which is inclined in the direction of opening of the groove. After insertion of the two mentioned components 5 and 8 the diameter of the locking ring 8 is enlarged by means of a tool or appliance imparting radial forces acting on and along the entire circumference of the ring to force the ring into the groove 7, while at the same time the end of the sleeve is bent into the groove. These radial forces required for expanding the locking ring and simultaneously pressing it into the groove preferably are applied by purely mechanical means, for example by a conical mandrel the outer diameter of which coacts with a ring which is split into a plurality of segments and the outer diameter of which varies upon axial displacement of the mandrel. Consequently, also the widths of the gap between the individual segments vary, but this has no prejudicial effect on the sealing quality of the finished sealing connection. However, it is also possible to impart these radial forces by means of a rubber cushion; but in this case the wear of the rubber cushion is considerable.

After having terminated this operation, the sleeve 3, as shown in FIG. 3 is tightly connected and at the clamping point between the inclined wall of the groove in the casing 6 and the flanged end of the sleeve there is formed a tight seal. The locking ring 8 undergoes plastic deformation when pressed into the wedge groove 7, so that it is held in the groove owing to elastic bias or stress, and thereby differences in thermal expansion between the material of the sleeve and that of the casing can be compensated without impairing the tightness or solidity of the seal.

It is not only possible to provide the clamping structure at the end of the sleeve, but as well at a point intermediate both ends of the sleeve. In this case the locking ring then causes clamping of an intermediate annular portion of the sleeve to each wall of the groove. The removal of the sealing connection is effected in the modification according to FIGS. 2 and 3 in the same manner as in the example according to FIG. 1. Only, in the second example, the sleeve will be demolished when it is dismantled.

I claim:

1. A sealing connection between a solid body and a tubular sleeve in which said body is provided with an annular groove and said sleeve comprises an annular portion penetrating into said groove, a locking ring inserted into the groove for clamping in a self-locking manner the annular portion of the sleeve between the locking ring and at least one wall of the groove, said body is provided with a bore and said tubular sleeve is inserted in said bore, the annular portion of said sleeve penetrating radially in said groove and being provided in the bore of the body, said annular portion being clamped in axial direction between the locking ring inserted into said groove and said at least one wall of the groove, said locking ring consisting of a single piece and inserted by radial expansion into said groove.

2. A sealing connection according to claim 1, in which the wall of said groove making contact with said annular portion of the sleeve is inclined in the direction of the opening of the groove for an amount from 5 to 15%.

3. A sealing connection according to claim 1, in which the annular portion of the sleeve is formed by radial deformation of a portion of the sleeve into the groove.

4. A sealing connection according to claim 3, wherein said annular portion of the sleeve is formed at one end of the sleeve.

* * * * *